United States Patent
Proni et al.

[11] 3,812,707
[45] May 28, 1974

[54] HEMATOCRIT TUBE MEASURING APPARATUS

[75] Inventors: Oscar Proni, Hollywood, Fla.; Brian S. Bull, Loma Linda, Calif.

[73] Assignee: Coulter Electronics, Inc., Hialeah, Fla.

[22] Filed: Aug. 30, 1972

[21] Appl. No.: 285,051

[52] U.S. Cl................... 73/61.4, 33/143 B, 356/40
[51] Int. Cl...................... G01n 15/04, G01n 33/16
[58] Field of Search...................... 73/61.4, 64.1, 53; 128/2 G, DIG. 22; 235/67, 87 R, 107; 23/230 B; 116/133; 33/143 B, 1 C; 283/1 A; 356/39, 40

[56] References Cited
UNITED STATES PATENTS

| | | | |
|---|---|---|---|
| 581,472 | 4/1897 | Shaver | 33/143 B |
| 731,175 | 6/1903 | Goodman | 235/87 R |
| 745,167 | 11/1903 | Duncan | 235/87 R |
| 2,741,913 | 4/1956 | Dovas | 73/61.4 |
| 2,750,671 | 6/1956 | Jones | 33/143 B UX |
| 3,168,473 | 2/1965 | Goda et al. | 73/61.4 X |
| 3,176,504 | 4/1965 | Shapiro | 73/61.4 |

FOREIGN PATENTS OR APPLICATIONS

| | | | |
|---|---|---|---|
| 882,165 | 2/1943 | France | 356/40 |
| 937,335 | 3/1948 | France | 33/143 B |
| 525,505 | 5/1955 | Italy | 73/61.4 |

Primary Examiner—Richard C. Queisser
Assistant Examiner—Joseph W. Roskos
Attorney, Agent, or Firm—Silverman & Cass

[57] ABSTRACT

A central cylindrical member has axially extending grooves opening to its circumferential surface and means for frictionally holding hematocrit capillary tubes inserted into the grooves. A transparent coaxial cylindrical tubular member is telescoped over the central cylindrical member and has a scale with a reference area provided thereon so that the hematocrit tubes can be aligned with chosen locations circumferentially along the reference area. The reference area has indicia establishing a lower limit which substantially lies in a plane normal to the axis of the cylindrical members and an upper limit whose distance from the lower limit increases uniformly circumferentially around the cylindrical members in one revolution. The reference area is everywhere divided into the same number of equal divisions, the division dimensions varying as the distance between upper and lower limits of the reference area. The exterior cylindrical member is rotatable relative to the central cylindrical member so that the reference area may be moved relative to a spun down hematocrit tube at a point where the contents of the tube are subtended between the upper and lower limits of the reference area so that percentage packed cell volume may be read directly on the reference scale. A toroidal magnifier may be coaxially slidable on the exterior cylindrical member to aid in reading the scale.

33 Claims, 9 Drawing Figures

PATENTED MAY 28 1974   3,812,707

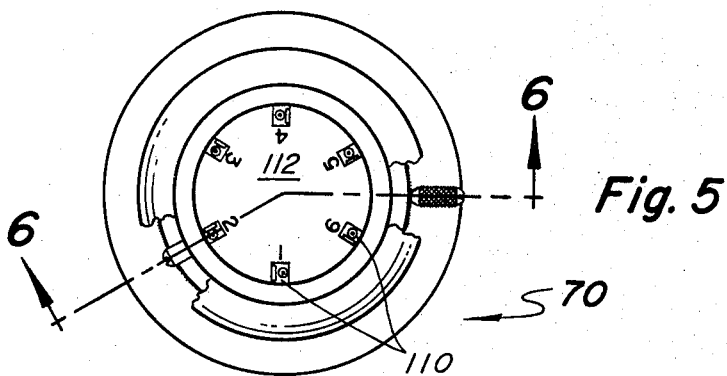
Fig. 5
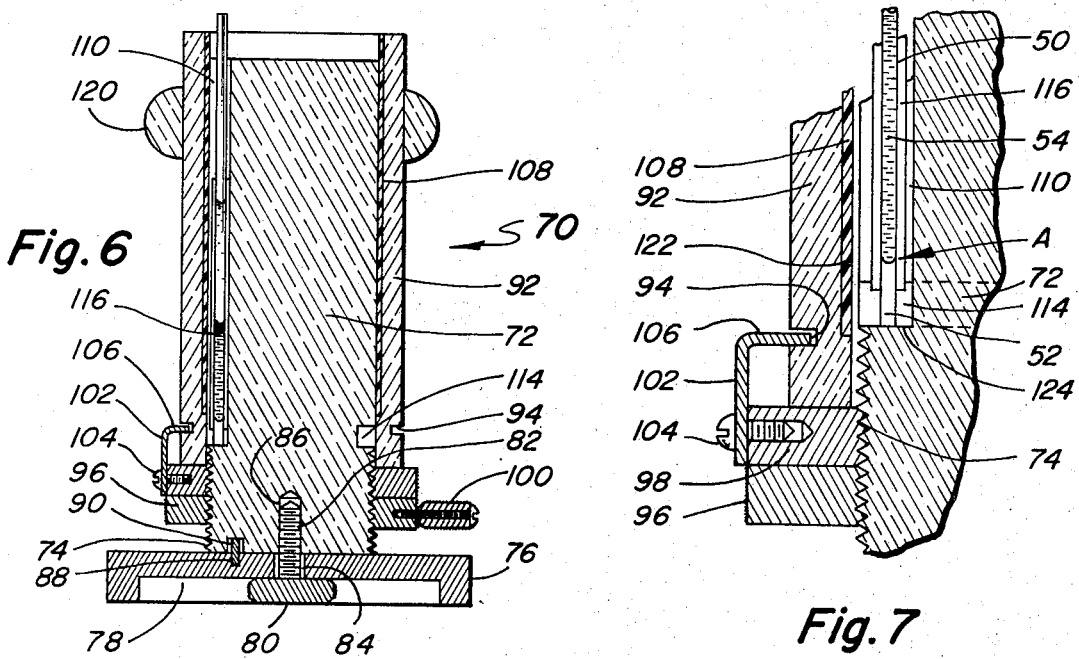
Fig. 6
Fig. 7
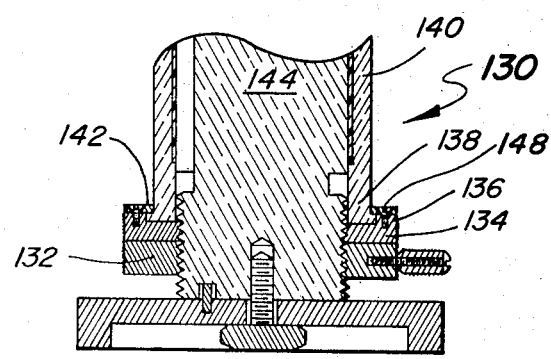
Fig. 8
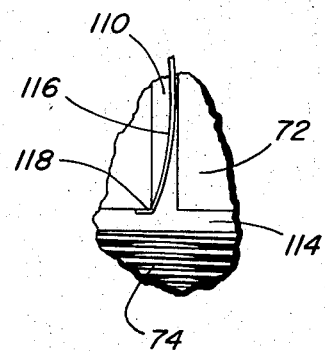
Fig. 7A

HEMATOCRIT TUBE MEASURING APPARATUS

BACKGROUND OF THE INVENTION

The invention is concerned with apparatus which renders reading hematocrit tubes more accurate and easier than present apparatus and methods.

The laboratory method of measuring hematocrit through the use of capillary tubing is to draw blood into a short length of tubing one end of which has been plugged with wax, clay or the like and then spinning the tube in a centrifuge to pack the red cells down or letting the tube stand for a period of time while the cells settle by gravity. The tube length now displays its contents in the form of very dark red cells at the bottom and relatively clear serum at the top, the separation being fairly easy to ascertain visually. The length of the packed cell column relative to the length of the overall contents of the tube comprises a percentage which is known as hematocrit, this being a hematological index useful in diagnosis, disease prevention and therapy.

To make the required measurement, the spun down tube is held against a scale which is marked off with suitable lines graphically to measure the packed cell volume directly in percentage. Such scales are commercially available and they consist basically of a series of generally horizontally extending lines vertically spaced apart equal distances at any horizontal location but the distances at any one location being different from the distances at another location so that the lines slant upwardly increasingly toward one end of the scale. For example, the scale has a set of one hundred lines evenly spaced at one end of the scale to occupy a distance of say 1⅝ inches and spaced evenly also at the other end of the scale but occupying a distance of 2½ inches. Intermediate locations provide different vertical distances.

The length of standard capillary tubes used for hematocrit measurement is about 3 inches and the amount of blood which is draw into the tube will normally fall between 1⅝ inches and 2½ inches. For smaller amounts, other dimensions of scales may be used.

The technician measures each length of spun down capillary tubing one at a time and must manipulate the same and make the reading on the scale. Such techniques easily produce errors and in addition are slow, time consuming and tedious. Accuracy depends upon how closely the scale can be read. Parallax problems arise and the use of a magnifying glass adds to the difficulties because of another article of apparatus to use and manipulate.

The invention solves the principal problems by providing a piece of apparatus which is quite simple in construction and simple to use with accuracy. It handles a plurality of tubes to be read with a single manipulation, eliminates errors and generally speeds up the testing of hematocrit.

SUMMARY OF THE INVENTION

According to the invention, the hematocrit tubes are disposed in grooves provided in a central cylindrical member. The scale above described is wrapped around the cylindrical member, being carried by a transparent outer cylindrical member telescoped over the central member. The user inserts the spun down hematocrit tubes into the grooves with the bottom end of the contents of each tube lying at the bottom line of the scale, the grooves having friction means to hold the tubes in any location to which they are moved. The scale itself may be movable axially with the outer cylindrical member so that all hematocrit tubes may be pushed to the bottom ends of their respective grooves, and, assuming equal plug lengths, the bottom of the scale may be moved to coincide with the bottom ends of the sample contents of all tubes at one time. The bottom line of the scale is straight on the normal scale and hence when wrapped around a cylinder the bottom limit of the reference area represented by the lines of the scale will define a plane normal to the axis of the cylinders. All tubes being in place, the technician rotates the outer cylinder for each tube until the upper end of the contents of that tube lies on the upper limit of the reference scale at some circumferential location. A toroidal magnifier which is carried coaxially on the exterior of the outer cylinder is now moved vertically to the location of the upper end of the packed cell volume and the percentage hematocrit is read directly. This is easily done for each of the plurality of tubes carried in the apparatus.

BRIEF DESCRIPTION OF THE DRAWINGS

FIG. 5 is a view similar to that of FIG. 2 but of a modified form of the invention;

FIG. 6 is a vertical sectional view taken generally through FIG. 5 along the plane 6-6 and in the direction indicated;

FIG. 7 is a fragmentary detail of the structure illustrated in FIG. 6 on an enlarged scale; and FIG. 7a is a fragmentary plan view of the bottom end of the inner cylindrical member of FIG. 7;

FIG. 8 is a fragmentary sectional view of the lower end of still another modified form of the invention.

DESCRIPTION OF THE PREFERRED EMBODIMENT

Figure 2:
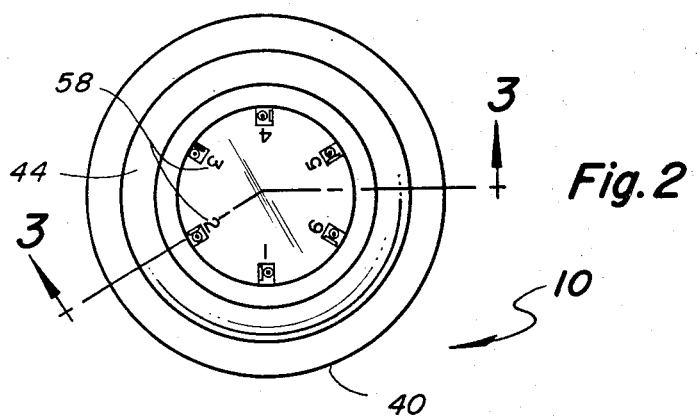
FIG. 2 is a top plan view of the device.
Figure 1:
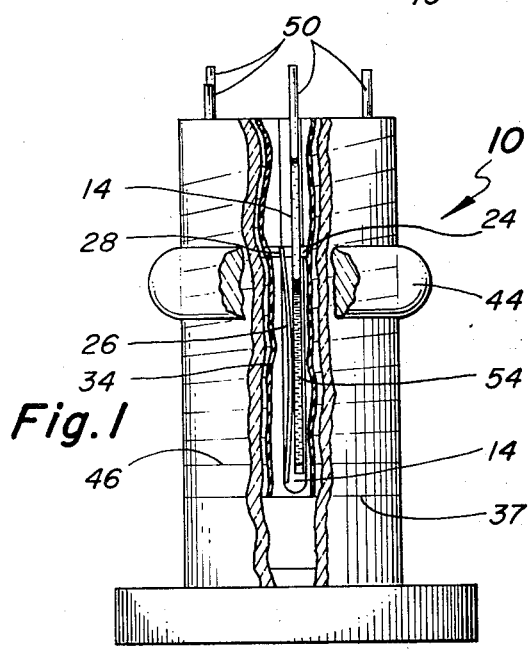
FIG. 1 is a front elevational view of the hematocrit tube measuring device constructed according to the invention with portions broken away to show the interior construction.

The hematocrit tube measuring device of the invention is designated generally by the reference character 10 and is preferably made out of transparent synthetic resin such as a methacrylate. The central core 12 comprises a solid cylindrical member having a plurality of axially extending grooves 14 of rectangular cross-section formed equally circumferentially spaced and opening to the exterior of the central cylindrical member 12. These grooves commence at the top surface 16 and extend to the point 18 which is spaced from the bottom end of the central cylindrical member 12. A reduced diameter section 20 gives rise to a shoulder 22 at the bottom of the member 12. An annular groove 24 is cut into the surface of the cylindrical member 12 intersecting the axial grooves 14. Each groove 14 has a bowed leaf spring 26 disposed therein with the bottom end of the leaf spring engaging the bottom end of the groove and the upper end of the leaf spring 26 hooked into the groove 24 as shown at 28 in order to prevent the leaf springs from falling out of the grooves.

An outer tubular cylindrical member 30 is telescopically engaged with the member 12 and rotatable relative thereto. On its interior surface it carries a scale wrapped around said surface, the scale being designated 32 and being illustrated in developed form in FIG. 4. While it is possible to engrave, print or otherwise apply the scale 32 to the interior surface of the outer cylindrical member 30, in a practical device the scale 32 consisted of a thin, flat plastic member 34 having the reference area 36 printed thereon. The natural resilience of the member 34 tending to re-assume its original flat condition held it to the inside surface of member 30. The outer diameter of the central cylindrical member 12 was decreased slightly from the bottom of the grooves 14 to the upper surface 16 to accommodate the scale 32 and to provide a very slight shoulder 37 to prevent the scale 32 from slipping below its desired location.

Figure 3:
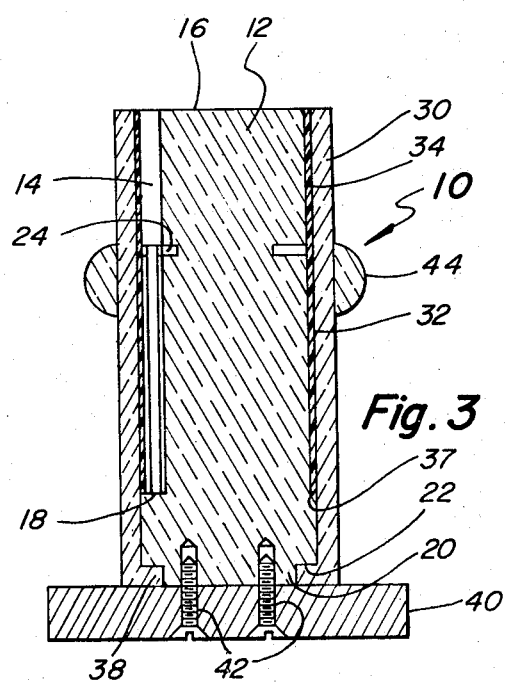
FIG. 3 is a sectional view taken generally through FIG. 2 along the plane 3—3 and in the direction indicated.

The bottom end of the outer cylindrical member 30 is provided with an interior flange 38 that cooperates with the shoulder 22 and the reduced diameter portion 20 to hold the device in assembly. For this purpose there is a disc-like base 40 not necessarily made of transparent material through which screws 42 are passed engaging in the central member 12 as shown in FIG. 3.

On its exterior the device 10 has a toroidal magnifier 44 which may be moved axially to any desired location.

Figure 4:
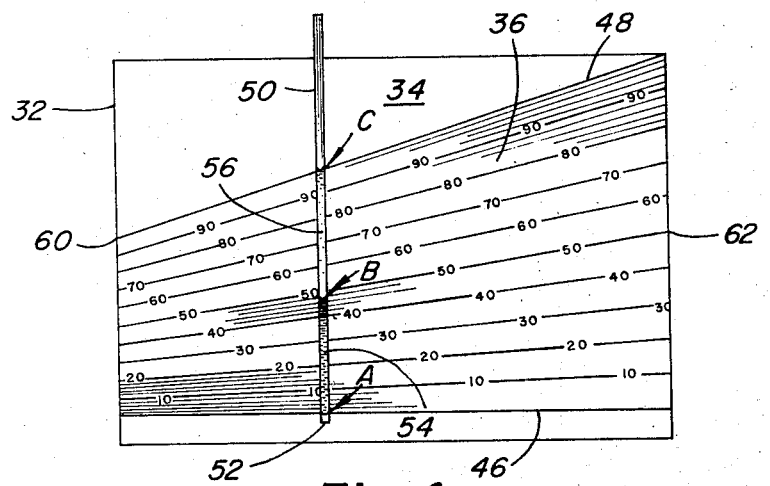
FIG. 4 is a developed view of the scale of the device.

Referring now to the scale 32 which is shown in developed form in FIG. 4, the reference area 36 has a lower limit represented by the line 46 and an upper limit represented by the line 48. If the line 46 is horizontal and the scale 32 is rectangular, when wrapped around the central cylindrical member 12 the scale will provide the line 46 lying in a plane which is normal to the axis of the cylinders 12 and 30. The reference area 36 provides 50 or 100 lines that appear to diverge from left to right as shown. At any given point along the length of the scale 32 the lines are equally spaced so that in effect the reference area 36 enables a graphic measurement of the proportional parts of any elongate member which subtended between the lines 46 and 48. One merely moves the member until the condition above mentioned is met and reads the percentages directly.

As an example, hematocrit tube 50 is shown in FIG. 4 positioned in front of the scale 32. The hematocrit tube 50 is a length of capillary tubing approximately 3 inches long previously plugged at its bottom with wax or clay as shown at 52 and having a quantity of blood drawn into the tube. The tube has been permitted to stand or has been centrifuged so that the red blood cells are packed at the bottom of the tube leaving the plasma at the top. The packed blood cells are shaded as shown at 54 and the plasma portion is left clear as shown at 56. Three arrows, A, B and C are used in FIG. 4 to point out the critical locations of the contents of the hematocrit tube 50. A is the bottom of the contents just above the plug 52. B is the point of separation between the packed cells 54 and the plasma 56. C is the surface of the plasma 56 and the upper limit of the contents of the tube. If the point A is placed directly on the line 46 and the point C directly on the line 48 then the point B is read on the reference area 36 as 48 percent this being the hematocrit index of the particular sample carried in the tube 50. In order to place the point C on the line 48 it is necessary to move the scale relative to the hematocrit tube right or left. The device 10 enables the technician to do this merely by rotating the outer cylinder 30 carrying the scale 32 with it.

In use, the technician inserts up to six spun down capillary tubes 50 into the grooves 14 from the top 16 of the central member 12, these grooves being identified on the top surface 16 by suitable indicia 58 which in this case comprises the numbers 1 to 6. Each hematocrit tube is engaged by a leaf spring 26 as it is pushed down into the slot 14 so that it may be left in any position to which it is moved. The technician carefully places the bottom end A of the packed cell section 54 directly on the line 46, doing this for each hematocrit tube. He may move the toroidal lens 44 over the line 46 in order to do this accurately. After all the hematocrit tubes are in position he now examines each tube in turn to find its hematocrit index. He rotates the cylinder 30 until the line 48 is seen to arrive directly on the point C of the contents of the capillary tube. He may use the toroidal lens 44 in order to find this point as well. He then moves the toroidal lens downwardly to the point B and reads the percentage hematocrit directly. He identifies the capillary tube by the indicia 58 from the top 16 of the cylinder 12.

After having done this the hematocrit tubes may be removed and discarded and the next batch measured.

In the construction of the apparatus 10 it may be convenient to form the reference area of the scale 32 so that capillary tubes less than half full, considering the presently available tubular length given above, can be easily read. In such case, the 100 percent point at one end of the area 36, designated 60 in FIG. 4, is at the same level as the 50 percent point at the opposite end of the area 36. When formed into its final cylindrical configuration, the scale 32 will have these points coinciding. Thus, in one revolution, the portion below the 50 percent line can be used for samples occupying less than half the length of the capillary tube, the values being multiplied by the factor two. The slight disadvantage of such a scale is that for most readings the lines on the reference area 36 will be slanted excessively for small diameter cylinders making it not as easy to establish the exact position of the meniscus of the sample. Where small samples are encountered infrequently, a more accurate device will have the point 60 as close to the top of the scale as practical so that readings are more accurate.

Modified forms of the invention are illustrated in FIGS. 5 through 8. These forms of the invention feature means for moving the outer tubular cylindrical member relative to the central cylindrical member for a purpose to be mentioned, and facilitate disassembly of the device for cleaning.

The hematocrit tube measuring device 70 illustrated in FIGS. 5 to 7 has a central cylindrical member 72 provided with a threaded section 74 adjacent the bottom thereof. The base 76 has a hollow bottom 78 to accommodate the head 80 of a thumbscrew 82 that engages through a hole 84 in the base 76 with the threaded socket 86 provided in the bottom of the central cylindrical member 72. A stop pin 88 set into the base 76 and protruding from the upper surface thereof engages a small recess 90 in the bottom of the central cylindrical member 72 offset from the axis thereof to prevent rotation of the base 76 and central cylindrical member 72 relative to one another when they are properly assembled.

The outer tubular cylindrical member 92 is the equivalent of the outer cylindrical member 30, but in this case is uniformly cylindrical from one end to the other without the interior flange 38 of the device 10. It has a narrow shallow annular groove 94 cut in its outer surface partway through its wall adjacent the bottom end thereof. Two threaded rings 96 and 98 are engaged on the threaded section 74, the lower one 96 having a handle 100 secured thereto and the upper one 98 having a hook-like retainer 102 secured thereto. The retainer 102 is secured by a suitable machine screw 104 and extends axially from the ring 98 toward the groove 94 at which point it has an inwardly bent tongue 106 engaging in the groove 94. If one holds the ring 98 and loosens the locking ring 96 by screwing the latter away from the adjusting ring 98, the rotation of the adjusting ring 98 will enable the outer tubular cylindrical member 92 to be moved axially with respect to the central cylindrical member 72. When any desired position has been reached, limited of course by the axial extent of the threaded section 74, the ring 96 may be tightened against the ring 98 locking the rings and hence the outer tubular cylindrical member 92 in place.

The remainder of the construction of the cylindrical members may be the same or similar to that of the apparatus 10. In this instance, there is a scale 108 on the interior of the outer tubular cylindrical member 92, either printed or etched on the interior surface or formed on a flexible thin transparent plastic member set into a space formed by slightly cutting into the interior surface of the member 92. Obviously the movement of the member 92 axially carries the scale 108 with it. Wells or axial grooves 110 are provided in the central member 72, opening to the top end 112 and terminating at an annular groove 114 with which they are connected. The flat leaf springs 116 which are the equivalent of the springs 26 are again engaged in the grooves 110 to hold capillary tubes in place, but in this form of the invention the springs are provided with small lips or hooks 118 that engage into the groove 114 as illustrated in FIG. 7A. Thus, the springs will not fall out of the grooves 110.

The device 70 is also equipped with a toroidal magnifying lens 120 similar to the lens 44 of the device 10.

The device 70 is used in the same manner as the device 10 except for two added features. The device 70 is readily disassembled by unscrewing the thumbscrew 82 so that the parts may be cleaned. The bottom reference border 122 (equivalent to the bottom line 46 of scale 32) of the scale 108 can be adjusted with respect to the bottom ends of the axial grooves 110. This is done by moving the outer cylindrical tubular member 92 axially with respect to the central cylindrical member 72. Thus, for any given period of use the capillary tubes may all be pushed to the very bottom ends of the grooves 110, bottoming right at the groove 114, the bottom reference border adjusted to lie directly upon the juncture between the clay plug and the packed cells and the outer cylindrical tubular member 92 rotated to bring the top of the contents of the capillary tubes to the 100 percent line and the hematocrits read in quick succession.

This will be understood by reference to FIG. 7. Here a capillary tube 50 having the spun down contents is placed in a groove 110 with its end having the clay plug 52 at the bottom. This end is pushed downwardly until the tube 50 engages the surface 124 which is the bottom of the groove 110 defined by the annular groove 114. The flat spring 116 holds the tube in place. The point A is now defined between the packed cells 54 and the clay plug 52. At this time, the outer tubular cylindrical member 92 is moved axially, being adjusted until the bottom reference line 122 lies directly over the point A. The member 92 is now locked in place. Since any series of hematocrit tubes is likely to be plugged from the same card containing a layer of clay or wax, the plugs in practically all cases will have the same length along the interior of the capillary tube. Consequently, all six lengths of capillary tube placed in the grooves 110 will have their points A' lying on the line 122 and no adjustment of the hematocrit tubes relative to their grooves need be made. This saves considerable time during the use of the device 70.

The device 130 of FIG. 8 differs from the device 70 only in the construction of the locking and adjusting rings and their cooperation with the outer tubular cylindrical member. Thus, the ring 132 is substantially the same as the ring 96. The ring 134 has an axially extending flange 136 which cooperates with a radially outwardly extending flange 138 integral with the outer cylindrical member 140 and disposed at the bottom axial end thereof. After the flanges 136 and 138 are engaged one within the other, a flat ring 142 is fastened onto the upper surface of the flange 136 by screws 144. The inner diameter of ring 142 is less than the outer diameter of the flange 138 and hence, the ring 142 locks the two fingers together while still permitting rotation of the outer cylindrical member 140 with respect to the inner cylindrical member 144 without disturbing the rings 132 and 134.

In the embodiments described in FIGS. 5–8, rings 96 and 98, as well as rings 132 and 134 preferably are formed of aluminum, anodized if desired, and may be provided with knurling 146 about their exterior annular surface to facilitate grasping and handling thereof. Of course, use of materials other than aluminum is feasible.

The operation of the device 130 is identical to the operation of the device 70.

Variations may be made in the apparatus of the invention without departing from the spirit or scope thereof as defined in the appended claims.

What it is desired to secure by Letters Patent in the United States is:

1. Apparatus for reading hematocrit tubes comprising:
   A. a cylindrical body having at least one axial groove opening to its outer surface,
   B. resilient friction means for retaining a hematocrit tube within said groove at any position to which it is moved,
   C. a rotatable transparent cylindrical scale coaxial with said cylindrical body and having a percentage measuring reference area visible from the exterior thereof, said scale being rotatable to bring a portion of said reference area into alignment with said tube to measure the relative length of the parts of the contents of said tube.

2. The apparatus as claimed in claim 1 in which means are provided for moving the scale axially with respect to the cylindrical body to adjust the position of the scale relative to said groove and to secure said scale in its adjusted position without interfering with its rotation relative to said cylindrical body.

3. The apparatus as claimed in claim 2 in which there is a plurality of said axial grooves circumferentially spaced around said cylindrical body for holding a plurality of hematocrit tubes therein in order to enable measurement of the relative lengths of the parts of the contents of all of the tubes.

4. The apparatus as claimed in claim 1 in which there is an outer transparent tubular cylindrical member telescoped over said cylindrical body and the said scale is provided on the interior of said outer cylindrical member.

5. The apparatus as claimed in claim 4 in which there is a plurality of said axial grooves circumferentially spaced around said cylindrical body for holding a plurality of hematocrit tubes therein in order to enable measurement of the relative lengths of the parts of the contents of all of the tubes.

6. The apparatus as claimed in claim 1 in which there is an outer transparent tubular cylindrical member telescoped over said cylindrical body and said scale is comprised of a flexible member mounted on the interior of said outer cylindrical member interposed between said tubular outer member and the cylindrical body.

7. The apparatus as claimed in claim 6 in which there is a plurality of said axial grooves circumferentially spaced around said cylindrical body for holding a plurality of hematocrit tubes therein in order to enable measurement of the relative lengths of the parts of the contents of all of the tubes.

8. The apparatus as claimed in claim 1 in which said reference area has indicia establishing a lower limit lying substantially in a plane normal to the axis of said cylindrical body and an upper limit whose distance from the lower limit increases uniformly, said reference area being divided into the same number of equal divisions but the division dimensions varying as the distance between the said upper and lower limits.

9. The apparatus as claimed in claim 8 in which the entire reference area is traversed on one revolution of the cylindrical scale.

10. The apparatus as claimed in claim 1 in which there is a base and means for releasably securing said central cylindrical body to said base.

11. The apparatus as claimed in claim 1 and torroidal magnifier means coaxially slidably mounted on the exterior of the outer cylindrical scale.

12. The apparatus as claimed in claim 1 in which there is a plurality of said axial grooves circumferentially spaced around said cylindrical body for holding a plurality of hematocrit tubes therein in order to enable measurement of the relative lengths of the parts of the contents of all of the tubes.

13. The apparatus as claimed in claim 1 in which there is a plurality of said axial grooves circumferentially spaced around said cylindrical body for holding a plurality of hematocrit tubes therein in order to enable measurement of the relative lengths of the parts of the contents of all of the tubes.

14. A hematocrit tube reading device comprising a central core and a plurality of axially extending grooves formed circumferentially about said core, said grooves opening to the exterior surface of said core for receiving hematocrit tubes therein, an outer transparent tubular member telescopically engaged with said core and rotatable relative thereto, means defining a scale disposed circumferentially about the exterior surface of said core and rotatable with said tubular member, resilient means within said grooves for frictionally maintaining the position of said hematocrit tubes therein, said scale having a percentage reference area and capable of being brought into alignment selectively with each of said hematocrit tubes on rotation of said tubular member to measure the relative length of the parts of the contents of said hematocrit tubes.

15. The reading device as claimed in claim 14 in which said core has an annular groove proximate said axial grooves and said resilient means are respectively anchored within said annular groove.

16. The reading device as claimed in claim 14 in which said resilient means comprise a bowed leaf spring, said core has an annular groove proximate said axially extending grooves and one end of each of said leaf springs is engaged within said annular groove.

17. The reading device as claimed in claim 14 wherein said resilient means comprise spring members, each engaged within one of said axially extending grooves, an annular groove formed in said core proximate the lower ends of said axially extending grooves and means at the lower ends of said spring members engaged within said annular groove for anchoring said spring ends thereto.

18. The reading device as claimed in claim 14 and a toroidal magnifier coaxially slidable frictionally on the exterior of said outer tubular member.

19. The reading device as claimed in claim 14 and means for moving the outer tubular member axially relative to the central core, said means including locking means fixing the axial location of said outer tubular member relative to the central core.

20. The reading device as claimed in claim 19 wherein said means for moving comprises an annular ring having a threaded inner wall and said central core includes a depending threaded portion engaged with said annular ring and means for connecting said annular ring to said outer tubular member for conjoined movement whereby rotation of said ring causes said outer tubular member to be moved axially relative to said central core albeit permitting independent rotational movement of said tubular member relative to said central core thereto.

21. The reading device as claimed in claim 19 in which said moving means comprise an annular ring having a threaded inner wall in said central core includes a depending threaded portion engaged with said annular ring and means for connecting said annular ring to said outer tubular member for conjoined movement so that rotation of said ring causes said outer tubular member to be moved axially relative to said central core albeit permitting independent rotation of movement of said tubular member relative to said central core, and said locking means comprise a second ring threadably secured to said depending threaded portion immediately adjacent said annular ring and adapted for rotation to engage said annular ring locking same in any position to which same has been moved.

22. The reading device as claimed in claim 21 in which at least one of said rings has a knurled outer surface to facilitate grasping thereof.

23. The reading device as claimed in claim 14 and means for moving the outer tubular member axially relative to the central core, said moving means comprise a pair of rings axially movable one relative to the other and to said central core, and said locking means comprise means on one of said rings for retaining said tubular member in a fixed position spaced therefrom for axial movement therewith and the other ring being movable into frictional engagement with said one ring to lock the same in any predisposed axial relationship with said central core.

24. The reading device as claimed in claim 23 in which at least one of said rings has a knurled outer surface to facilitate grasping thereof.

25. The reading device as claimed in claim 23 in which said last mentioned means comprises a tongue fastened to one of said rings and tubular member and groove means formed in the other one of said rings and tubular member and adapted to receive said tongue.

26. The reading device as claimed in claim 23 in which said rings have interlocked flanges and a third ring member of lesser diameter than one of said flanges is releasably secured on one of said flanges locking said flanges together.

27. The reading device as claimed in claim 14 in which there is a base member mounting said central core and said tubular member being coupled thereto and threaded pin and socket means on said base and central core to define a releasable coupling therebetween.

28. The reading device as claimed in claim 14 in which said reference area has indicia establishing a lower limit lying substantially in a plane normal to the axis of said center core and an upper limit whose distance from the lower limit increases uniformly, said reference area being divided into the same number of equal divisions but the division dimensions varying as the distance between the said upper and lower limits.

29. Apparatus for reading hematocrit tubes comprising a body having an outer surface and at least one groove opening to said surface and being of size and configuration to receive a hematocrit tube therein in predetermined position relative to said groove, a transparent scale arranged for frictional movement upon said surface along a path normal to said hematocrit tube, said scale having a percentage measuring reference area visible from the exterior thereof, said scale being movable relative to said surface to bring a portion of said reference area into alignment with said hematocrit tube to measure the relative lengths of parts of the contents of said tube.

30. The apparatus as claimed in claim 29 in which the groove has friction means to maintain said predetermined position.

31. The apparatus as claimed in claim 29 including means to move said scale axially relative to said hematocrit tube and means fixedly to locate said scale at any selected position axially relative to said groove.

32. The apparatus as claimed in claim 29 wherein said scale is slidable relative to said body surface.

33. The apparatus as claimed in claim 29 in which the groove has friction means therein to maintain said predetermined position and means for axially moving said scale relative to said hematocrit tube and means to lock said scale at a selected location relative to said groove.

* * * * *